(12) United States Patent
Famularo et al.

(10) Patent No.: US 11,873,082 B2
(45) Date of Patent: Jan. 16, 2024

(54) AIRCRAFT PROPULSION SYSTEM

(71) Applicant: Aurora Flight Sciences Corporation, a subsidiary of the Boeing Company, Manassas, VA (US)

(72) Inventors: Douglas Famularo, Boston, MA (US); Jose Antonio Turalba, Cambridge, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 165 days.

(21) Appl. No.: 17/590,414

(22) Filed: Feb. 1, 2022

(65) Prior Publication Data

US 2022/0363375 A1    Nov. 17, 2022

Related U.S. Application Data

(60) Provisional application No. 63/187,050, filed on May 11, 2021.

(51) Int. Cl.
| | |
|---|---|
| *B64C 27/00* | (2006.01) |
| *B64C 27/57* | (2006.01) |
| *B64C 27/52* | (2006.01) |
| *G05D 1/08* | (2006.01) |

(52) U.S. Cl.
CPC ............. *B64C 27/57* (2013.01); *B64C 27/52* (2013.01); *G05D 1/0858* (2013.01)

(58) Field of Classification Search
CPC ....... B64C 27/57; B64C 27/52; B64C 39/024; B64C 29/0033; G05D 1/0858; B64U 2201/10; B64U 10/13; B64U 30/20
See application file for complete search history.

(56) References Cited

U.S. PATENT DOCUMENTS

2021/0339848 A1*  11/2021  Selwa ................. B64C 13/0421

* cited by examiner

*Primary Examiner* — Ian Jen
(74) *Attorney, Agent, or Firm* — McDonnell Boehnen Hulbert & Berghoff LLP

(57) ABSTRACT

In an example, a propulsion system for controlling maneuvers of a tilt rotor aircraft includes one or more processors and a non-transitory computer readable medium storing instructions that, when executed by the one or more processors, cause the propulsion system to perform functions. The functions include making a determination that changing an orientation of the tilt rotor aircraft is necessary to perform an instructed flight maneuver. The functions also include causing, in response to the determination, a rotor of the tilt rotor aircraft to provide a thrust, thereby applying a torque to the tilt rotor aircraft that changes the orientation of the tilt rotor aircraft.

20 Claims, 11 Drawing Sheets

```
┌─────────────────────────────────────────────────────────────┐
│  MAKING A DETERMINATION, VIA A PROPULSION SYSTEM, THAT      │
│ CHANGING AN ORIENTATION OF THE AIRCRAFT IS NECESSARY TO     │
│     PERFORM AN INSTRUCTED FLIGHT MANEUVER                   │
└─────────────────────────────────────────────────────────────┘
    202⌐
                              │
                              ▼
┌─────────────────────────────────────────────────────────────┐
│  CAUSING, VIA THE PROPULSION SYSTEM IN RESPONSE TO THE      │
│   DETERMINATION, A ROTOR OF THE AIRCRAFT TO PROVIDE A       │
│ THRUST, THEREBY APPLYING A TORQUE TO THE AIRCRAFT THAT      │
│      CHANGES THE ORIENTATION OF THE AIRCRAFT                │
└─────────────────────────────────────────────────────────────┘
    204⌐
                                                    ↖
                                                     200
```

FIG. 9

```
┌─────────────────────────────────────────────────────────────┐
│ TILTING THE ROTOR IN RESPONSE TO THE DETERMINATION THAT     │
│ TILTING THE ROTOR WITH RESPECT TO A BODY OF THE AIRCRAFT    │
│   IS ALSO NECESSARY TO PERFORM THE INSTRUCTED FLIGHT        │
│                      MANEUVER                               │
└─────────────────────────────────────────────────────────────┘
    206⌐
                                                    ↖
                                                     250
```

FIG. 10

CAUSING THE ROTOR TO TILT TO THE MAXIMUM TILT ANGLE IN RESPONSE TO DETERMINING THAT PERFORMING THE INSTRUCTED FLIGHT MANEUVER WITHOUT CHANGING THE ORIENTATION OF THE AIRCRAFT REQUIRES TILTING THE ROTOR BEYOND THE MAXIMUM TILT ANGLE — 208 ← 350

FIG. 11

CAUSING THE ROTOR TO TILT AT THE MAXIMUM TILT VELOCITY IN RESPONSE TO DETERMINING THAT PERFORMING THE INSTRUCTED FLIGHT MANEUVER WITHOUT CHANGING THE ORIENTATION OF THE AIRCRAFT REQUIRES TILTING THE ROTOR AT A TILT VELOCITY THAT EXCEEDS THE MAXIMUM TILT VELOCITY — 210 ← 450

FIG. 12

THRUSTING THE ROTOR AT THE MAXIMUM THRUST IN RESPONSE TO DETERMINING THAT PERFORMING THE INSTRUCTED FLIGHT MANEUVER WITHOUT CHANGING THE ORIENTATION OF THE AIRCRAFT REQUIRES THRUSTING THE ROTOR TO EXCEED THE MAXIMUM THRUST — 212

DETERMINING AN ANGLE BY WHICH TO CHANGE THE ORIENTATION OF A BODY OF THE AIRCRAFT, WHEREIN CAUSING THE ROTOR TO PROVIDE THE THRUST COMPRISES CAUSING THE ROTOR TO CHANGE THE ORIENTATION OF THE BODY OF THE AIRCRAFT BY THE ANGLE — 214

AIRCRAFT PROPULSION SYSTEM

CROSS REFERENCE TO RELATED APPLICATION

The present application is a non-provisional patent application claiming priority to U.S. Provisional Application No. 63/187,050, filed on May 11, 2021, the contents of which are hereby incorporated by reference.

FIELD

The present disclosure generally relates to aircraft propulsion systems, and more specifically to propulsion systems of tilt-rotor aircraft.

BACKGROUND

Tilt-rotor aircraft generally maintain a fixed orientation (e.g., a horizontal body) throughout flight. This can yield the advantage of providing an aerodynamic cross section to reduce drag. On the other hand, the aircraft's performance is generally limited by the maximum rotor tilt angle and the maximum rotor tilt rate when changing the orientation of the aircraft is not allowed. That is, some maneuvers are not possible when the orientation of the aircraft is fixed. Thus, a need exists for propulsion methods that take advantage of the reduced drag provided by flying at a fixed orientation as well as the increased maneuverability provided by allowing the orientation of the aircraft to change.

SUMMARY

One aspect of the disclosure is a propulsion system for controlling maneuvers of a tilt rotor aircraft, the propulsion system comprising: one or more processors; and a non-transitory computer readable medium storing instructions that, when executed by the one or more processors, cause the propulsion system to perform functions comprising: making a determination that changing an orientation of the tilt rotor aircraft is necessary to perform an instructed flight maneuver; and causing, in response to the determination, a rotor of the tilt rotor aircraft to provide a thrust, thereby applying a torque to the tilt rotor aircraft that changes the orientation of the tilt rotor aircraft.

Another aspect of the disclosure is method for controlling maneuvers of a tilt rotor aircraft, the method comprising: making a determination, via a propulsion system, that changing an orientation of the tilt rotor aircraft is necessary to perform an instructed flight maneuver; and causing, via the propulsion system in response to the determination, a rotor of the tilt rotor aircraft to provide a thrust, thereby applying a torque to the tilt rotor aircraft that changes the orientation of the tilt rotor aircraft.

Another aspect of the disclosure is a non-transitory computer readable medium storing instructions that, when executed by a propulsion system of a tilt rotor aircraft, cause the propulsion system to perform functions comprising: making a determination that changing an orientation of the tilt rotor aircraft is necessary to perform an instructed flight maneuver; and causing, in response to the determination, a rotor of the tilt rotor aircraft to provide a thrust, thereby applying a torque to the tilt rotor aircraft that changes the orientation of the tilt rotor aircraft.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 9 is block diagram of a method, according to an example.

FIG. 10 is block diagram of a method, according to an example.

FIG. 11 is block diagram of a method, according to an example.

FIG. 12 is block diagram of a method, according to an example.

FIG. 13 is block diagram of a method, according to an example.

FIG. 14 is block diagram of a method, according to an example.

DETAILED DESCRIPTION

As discussed above, a need exists for propulsion methods that take advantage of the reduced drag provided by flying a tilt rotor aircraft at a fixed orientation as well as the increased maneuverability provided by allowing the orientation of the tilt rotor aircraft to change during flight.

Within examples, a method includes a propulsion system making a determination that changing an orientation of the tilt rotor aircraft is necessary to perform an instructed flight maneuver. For example, the propulsion system can determine that the tilt rotor aircraft performing a requested acceleration (e.g., along any of the three axes of physical space) requires changing an orientation of the tilt rotor aircraft and not merely changing the tilt of a rotor of the tilt rotor aircraft. Next, the propulsion system causes, in response to the determination, the rotor of the tilt rotor aircraft to provide a thrust, thereby applying a torque to the tilt rotor aircraft that changes the orientation of the tilt rotor aircraft. The changed orientation might allow the tilt rotor aircraft to perform maneuvers that were impractical at the fixed horizontal orientation.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-8 are schematic diagrams of a tilt rotor aircraft 10 and related functionality.

Figure 1:
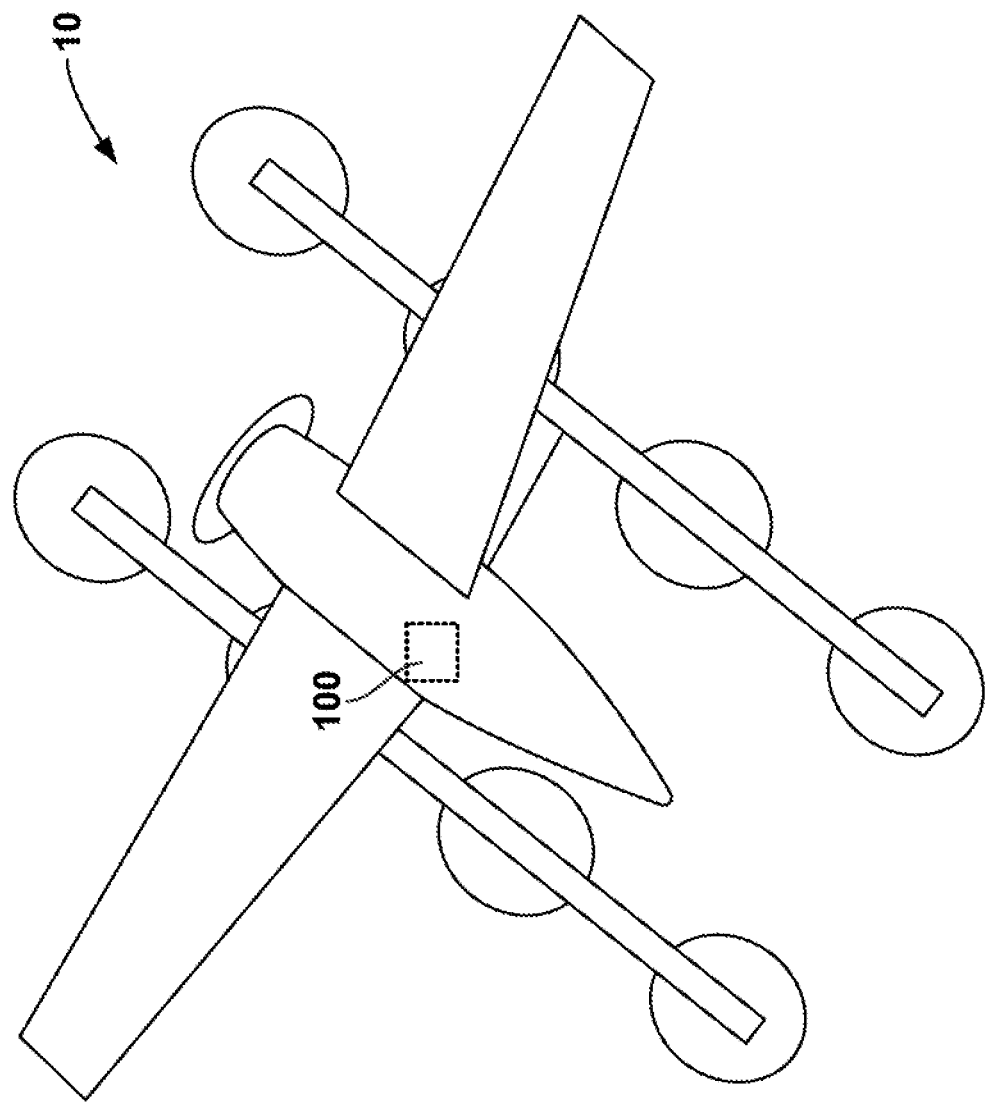
FIG. 1 is a schematic diagram of an aircraft, according to an example.

FIG. 1 is a schematic diagram of the tilt rotor aircraft 10. The tilt rotor aircraft 10 can be a helicopter, a rotorcraft, an unmanned aerial vehicle (e.g., a drone or a satellite), a vertical take-off and landing (VTOL) aircraft, or the like. The tilt rotor aircraft 10 includes a propulsion system 100.

Figure 2:
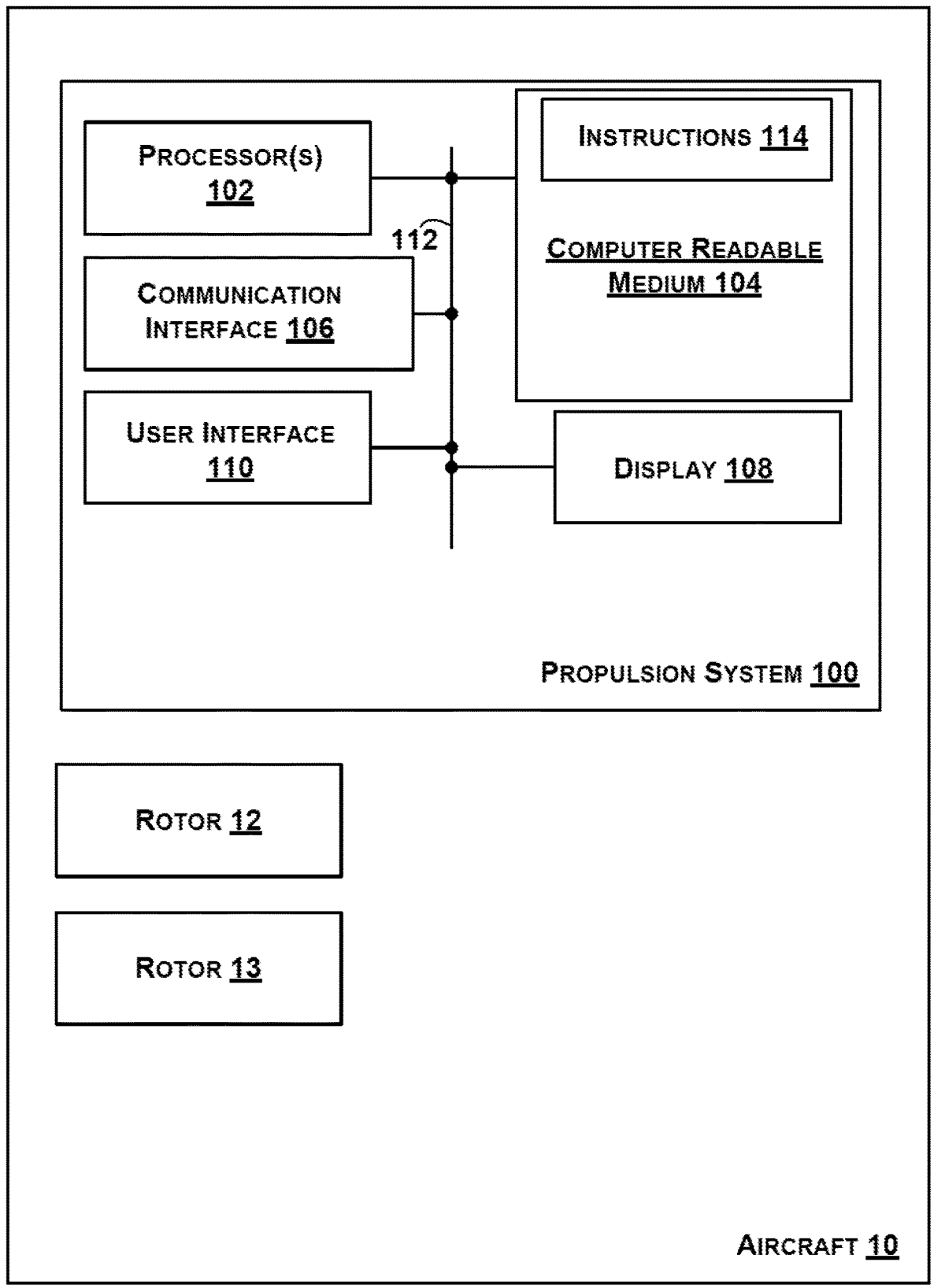
FIG. 2 is a block diagram of an aircraft, according to an example.

FIG. 2 is a schematic block diagram of the tilt rotor aircraft 10. The tilt rotor aircraft 10 includes a rotor 12 and a rotor 13. The rotor 12 and the rotor 13 typically take the form of a propeller, but other examples are possible.

The propulsion system 100 includes one or more processors 102, a non-transitory computer readable medium 104, a communication interface 106, a display 108, and a user interface 110. Components of the propulsion system 100 are linked together by a system bus, network, or other connection mechanism 112.

The one or more processors 102 can be any type of processor(s), such as a microprocessor, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can be configured to store instructions 114. The instructions 114 are executable by the one or more processors 102 to cause the propulsion system 100 to perform any of the functions or methods described herein.

The communication interface 106 can include hardware to enable communication within the propulsion system 100 and/or between the propulsion system 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the propulsion system 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The display 108 can be any type of display component configured to display data. As one example, the display 108 can include a touchscreen display. As another example, the display 108 can include a flat-panel display, such as a liquid-crystal display (LCD) or a light-emitting diode (LED) display. Additionally or alternatively, the display 108 includes a virtual reality display, an extended reality display, and/or an augmented reality display.

The user interface 110 can include one or more pieces of hardware used to provide data and control signals to the propulsion system 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the propulsion system 100 (e.g., displayed by the display 108).

Figure 3:
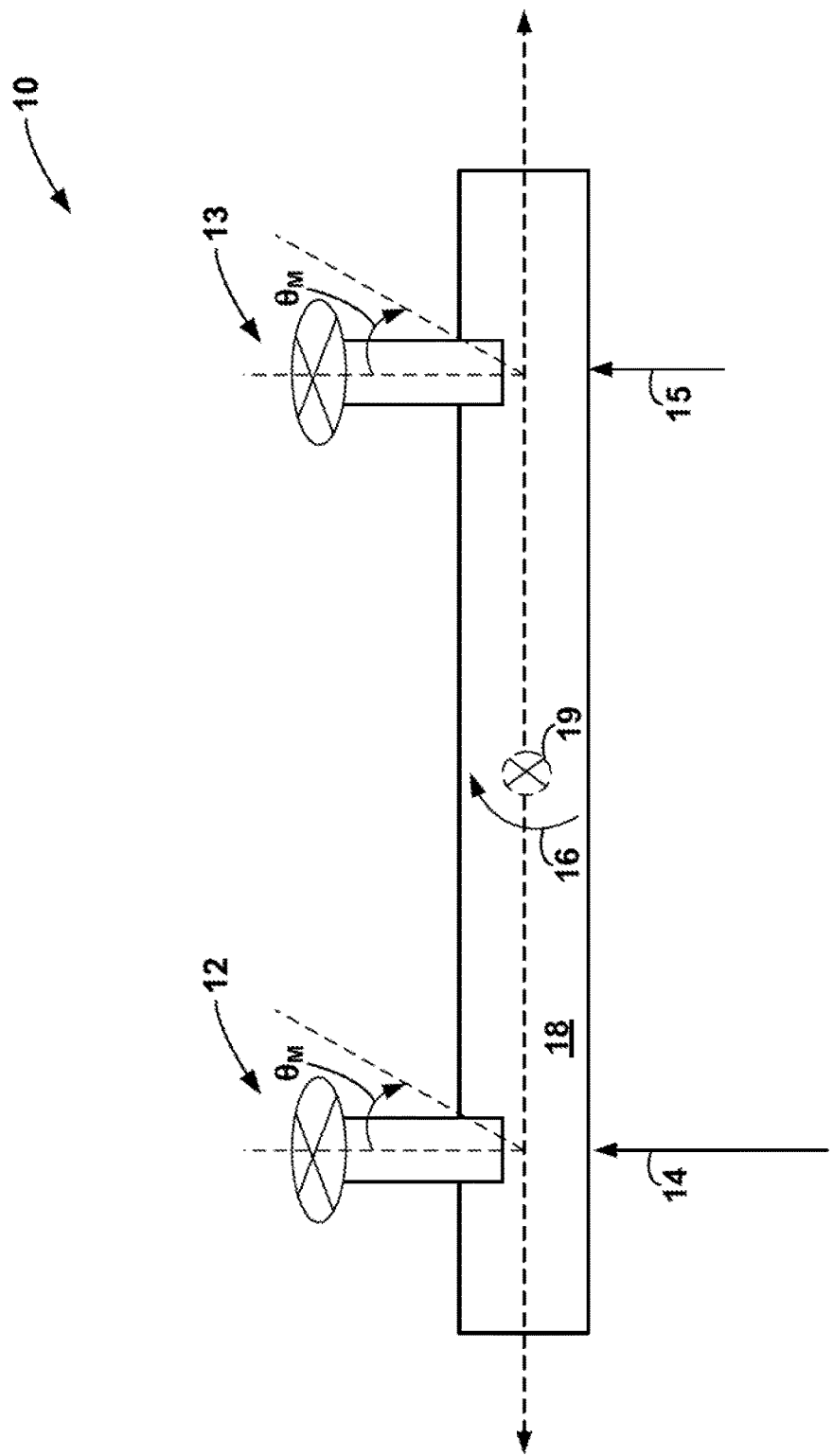
FIG. 3 is a schematic diagram of an aircraft, according to an example.

FIG. 3 is a schematic diagram of the tilt rotor aircraft 10 and related functionality. As shown, the tilt rotor aircraft 10 includes the rotor 12 and the rotor 13. The tilt rotor aircraft 10 will often have more than two rotors (e.g., four rotors), but the tilt rotor aircraft 10 is illustrated in FIG. 2 and subsequent figures with only two rotors for clarity.

In various examples, the tilt rotor aircraft 10 can receive an instruction to perform a particular flight maneuver such as an abrupt dive, an abrupt stop, an abrupt climb, an abrupt acceleration, etc. The instruction can be received via the user interface 110 from a human pilot that is onboard the tilt rotor aircraft 10. In another example, the instruction is received wirelessly via the communication interface 106 (e.g., from human operator on the ground). In yet other examples, the tilt rotor aircraft 10 is fully automated and the processor 102 generates the instruction based on the observed environment of the tilt rotor aircraft 10 and a control algorithm.

Upon receiving the instruction, the propulsion system 100 makes a determination that changing an orientation (e.g., pitch, roll, or yaw) of the tilt rotor aircraft 10 is necessary to perform the instructed flight maneuver. In this case, the instructed flight maneuver is an abrupt rightward acceleration. Typically, the propulsion system 100 will make the determination that changing the orientation of the tilt rotor aircraft 10 is necessary based on a performance characteristic (e.g., a physical limitation) of the rotor 12 and/or the rotor 13. That is, the propulsion system 100 determines tilting a body 18 of the tilt rotor aircraft 10 can compensate for the limitations of the rotor 12 and/or the rotor 13 to achieve the instructed flight maneuver. Examples of the performance characteristics of the rotor 12 and/or the rotor 13 that are evaluated include a maximum tilt angle, a maximum tilt velocity, and/or a maximum thrust. Other examples are possible.

As an example, the propulsion system 100 makes a determination that changing the orientation of the tilt rotor aircraft 10 is necessary to perform the instructed flight maneuver based on the maximum tilt angle θM of the rotor 12 and/or the rotor 13. In various examples, the rotor 12 and the rotor 13 have unequal or equal maximum tilt angles. In other words, the propulsion system 100 determines that the instructed flight maneuver is not feasible simply by tilting the rotor 12 and/or the rotor 13 by an angle that is less than or equal to the maximum tilt angle θM. That is, the propulsion system 100 determines that performing the instructed flight maneuver without changing the orientation of the tilt rotor aircraft 10 requires tilting the rotor 12 and/or the rotor 13 beyond the maximum tilt angle θM.

In other words, the propulsion system 100 determines that all combinations of a tilt angle α for the rotor 12 that is less than θM and a tilt angle β for the rotor 13 (see FIG. 6) that is less than θM are insufficient for performing the instructed flight maneuver without allowing for body tilt of the aircraft 10.

In some examples, the propulsion system 100 causes the rotor 12 and/or the rotor 13 to nevertheless tilt to the maximum tilt angle θM in response to determining that performing the instructed flight maneuver without changing the orientation of the tilt rotor aircraft 10 requires tilting the rotor 12 and/or the rotor 13 beyond the maximum tilt angle θM. That is, tilting by the maximum tilt angle θM can be necessary but insufficient for performing the instructed flight maneuver.

As another example, the propulsion system 100 makes a determination that changing the orientation of the tilt rotor aircraft 10 is necessary to perform the instructed flight maneuver based on the maximum tilt velocity θM' of the rotor 12 and/or the rotor 13. In various examples, the rotor 12 and the rotor 13 have equal or unequal maximum tilt velocities. In other words, the propulsion system 100 determines that the instructed flight maneuver is not feasible simply by tilting the rotor 12 and/or the rotor 13 at a tilt (e.g., angular) velocity that is less than or equal to the maximum tilt velocity θM'. That is, the propulsion system 100 determines that performing the instructed flight maneuver without changing the orientation of the tilt rotor aircraft 10 requires tilting the rotor 12 and/or the rotor 13 at a tilt velocity that exceeds the maximum tilt velocity θM'.

In other words, the propulsion system 100 determines that all combinations of tilt velocities for the rotor 12 and the rotor 13 that are less than θM' are insufficient for performing the instructed flight maneuver without allowing for body tilt of the aircraft 10.

In some examples, the propulsion system 100 causes the rotor 12 and/or the rotor 13 to nevertheless tilt at the maximum tilt velocity θM' in response to determining that performing the instructed flight maneuver without changing the orientation of the tilt rotor aircraft 10 requires tilting the rotor 12 and/or the rotor 13 at a tilt velocity that exceeds the maximum tilt velocity θM', which can be necessary but insufficient for performing the instructed flight maneuver.

As yet another example, the propulsion system 100 makes a determination that changing the orientation of the tilt rotor aircraft 10 is necessary to perform the instructed flight maneuver based on the maximum thrust of the rotor 12 and/or the rotor 13. In various examples, the rotor 12 and the rotor 13 have unequal maximum thrusts or equal maximum thrusts. In other words, the propulsion system 100 determines that the instructed flight maneuver is not feasible simply by thrusting the rotor 12 and/or the rotor 13 at a thrust that is less than or equal to the maximum thrust of the rotor 12 and/or the rotor 13. That is, the propulsion system 100 determines that performing the instructed flight maneuver without changing the orientation of the tilt rotor aircraft 10 requires thrusting the rotor 12 and/or the rotor 13 to exceed the maximum thrust of the rotor 12 and/or the rotor 13.

In some examples, the propulsion system 100 causes the rotor 12 and/or the rotor 13 to nevertheless thrust at their respective maximum thrusts in response to determining that performing the instructed flight maneuver without changing the orientation of the tilt rotor aircraft 10 requires thrusting the rotor 12 and/or the rotor 13 to exceed the maximum thrust of the rotor 12 and/or the rotor 13, which may be necessary but insufficient for performing the instructed flight maneuver.

As a result of the determination that changing the orientation of the tilt rotor aircraft 10 is necessary to perform the instructed flight maneuver, the propulsion system 100 causes the rotor 12 to provide a thrust 14 and the rotor 13 to provide a thrust 15, thereby applying a torque 16 about a pitch axis 19 of the tilt rotor aircraft 10 that changes the orientation of the tilt rotor aircraft 10 and causes the tilt rotor aircraft 10 to perform the instructed flight maneuver. In this example, the thrust 14 and the thrust 15 both push the tilt rotor aircraft 10 upward against gravity, but the magnitude of the thrust 14 is greater than the magnitude of the thrust 15, resulting in the torque 16 being clockwise.

In some examples, the propulsion system 100 additionally determines that the aircraft 10 is at an altitude that is greater than a threshold altitude (e.g., 5,000 ft.) and in response causes the rotor 12 to provide the thrust 14 and/or the rotor 13 to provide the thrust 15. That is, it can be easier and more predictable to use body tilt in the less dense air of high altitude.

In some examples, the propulsion system 100 additionally determines that an ambient wind speed (e.g., of a cross wind) is less than a threshold velocity (e.g., 20 mph) and in response causes the rotor 12 to provide the thrust 14 and/or the rotor 13 to provide the thrust 15. That is, it can be easier and more predictable to use body tilt in the absence of significant cross winds.

Figure 4:
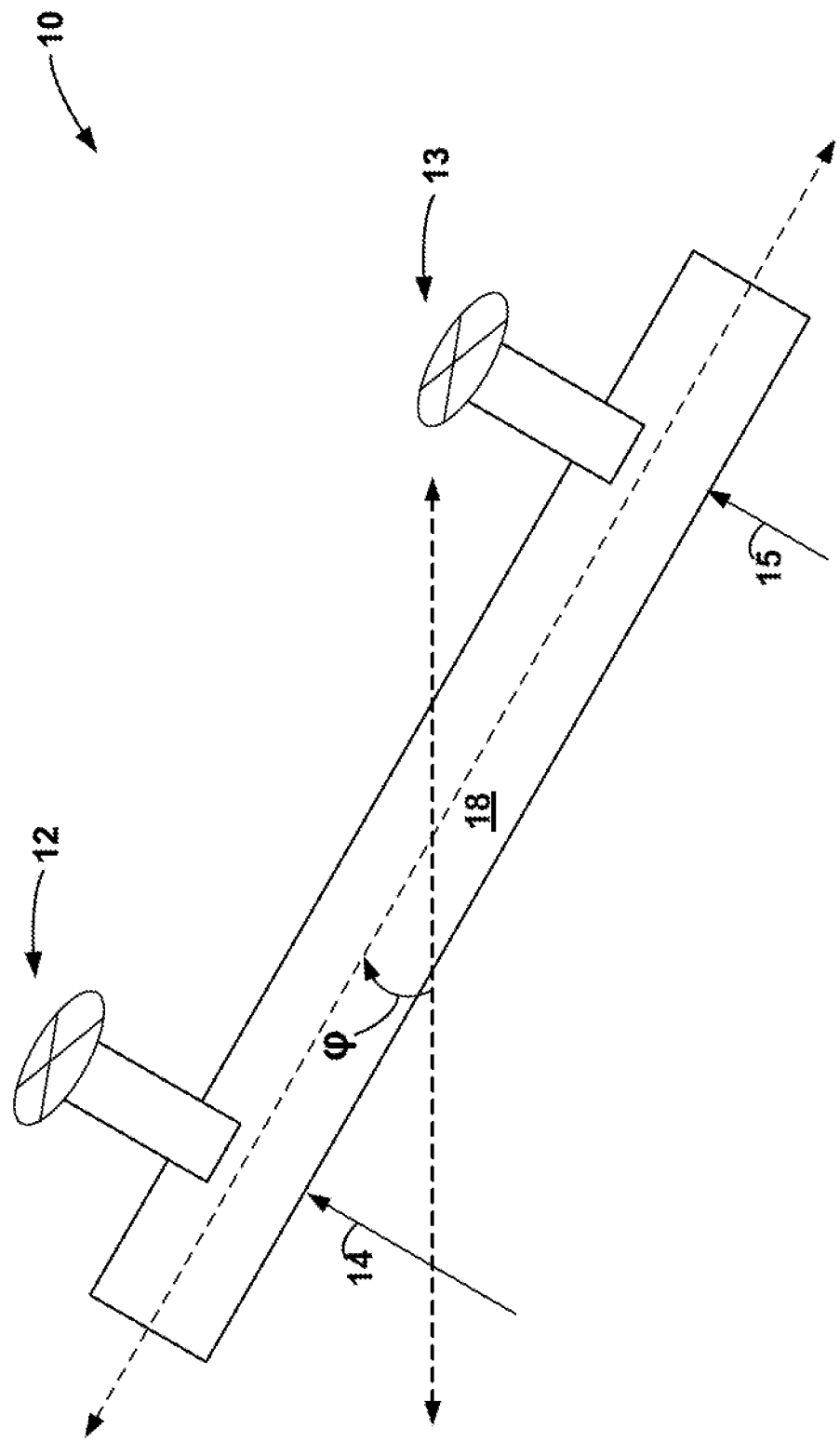
FIG. 4 is a schematic diagram of an aircraft, according to an example.

As shown in FIG. 4, the propulsion system 100 determines an angle Y by which to change the orientation of the body 18 of the tilt rotor aircraft 10 in order to perform the instructed flight maneuver. As such, the rotor 12 provides the thrust 14 and the rotor 13 provides the thrust 15 to change the orientation of the body 18 of the tilt rotor aircraft 10 by the angle φ.

Figure 5:
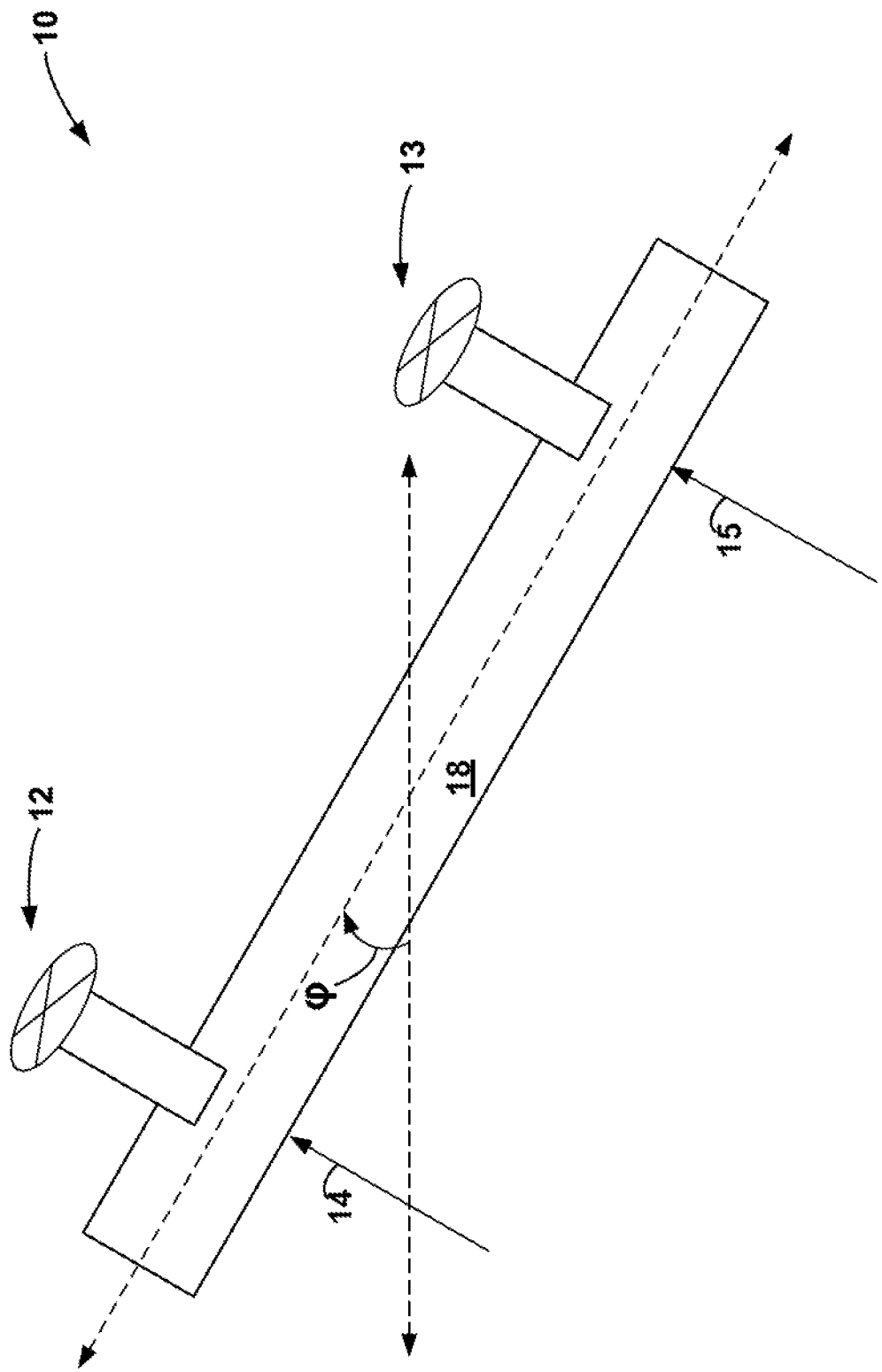
FIG. 5 is a schematic diagram of an aircraft, according to an example.

As shown in FIG. 5, once the desired orientation of the tilt rotor aircraft 10 has been achieved, the thrust 14 and the thrust 15 can be equalized in magnitude to provide a net rightward force to the tilt rotor aircraft 10 in concert with Earth's gravity.

Figure 6:
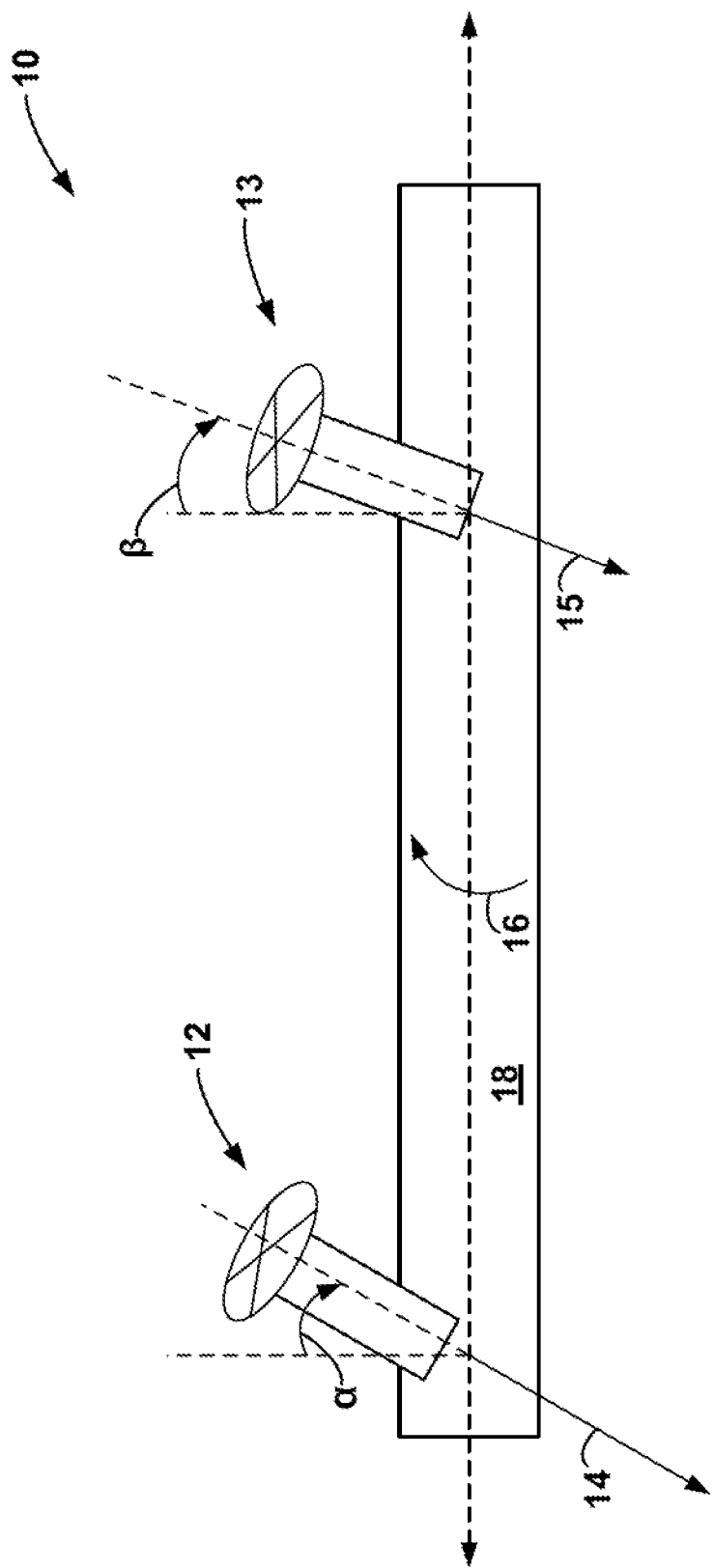
FIG. 6 is a schematic diagram of an aircraft, according to an example.

In the example of FIG. 6, the propulsion system 100 determines that tilting the rotor 12 and/or the rotor 13 with respect to the body 18 of the tilt rotor aircraft 10 is also necessary, in addition to changing the orientation of the tilt rotor aircraft 10, to perform the instructed flight maneuver. As a result, the propulsion system 100 tilts the rotor 12 by an angle α with respect to the body 18 and/or the rotor 13 by an angle β with respect to the body 18. In FIG. 6, the angle α and the angle β are unequal, but in other examples the angle α and the angle β are equal.

Figure 7:
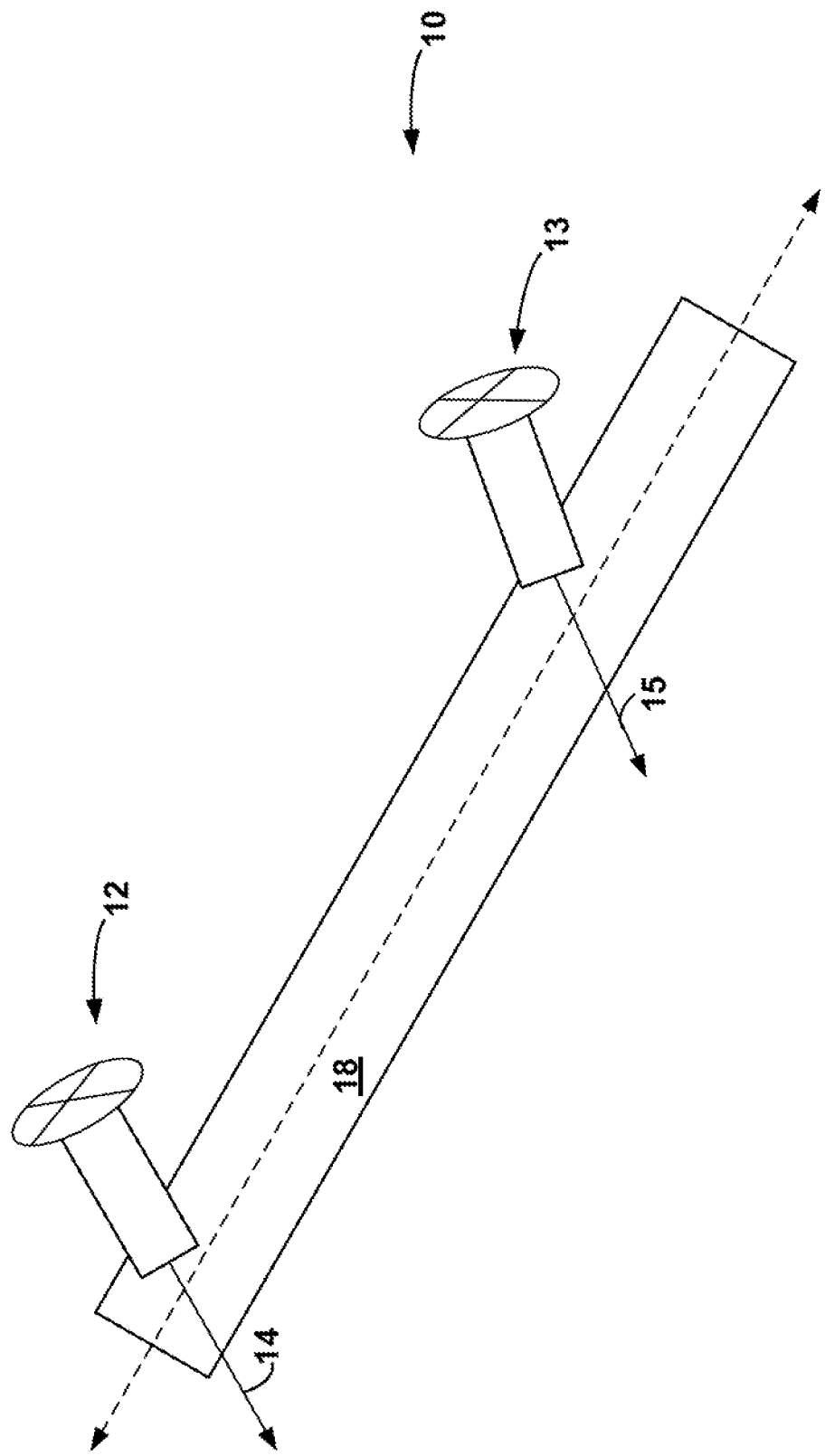
FIG. 7 is a schematic diagram of an aircraft, according to an example.

As shown in FIG. 7, once the desired orientation of the tilt rotor aircraft 10 has been achieved, the thrust 14 and the thrust 15 can be equalized in magnitude to provide a net rightward force to the tilt rotor aircraft 10 in concert with Earth's gravity.

Figure 8:
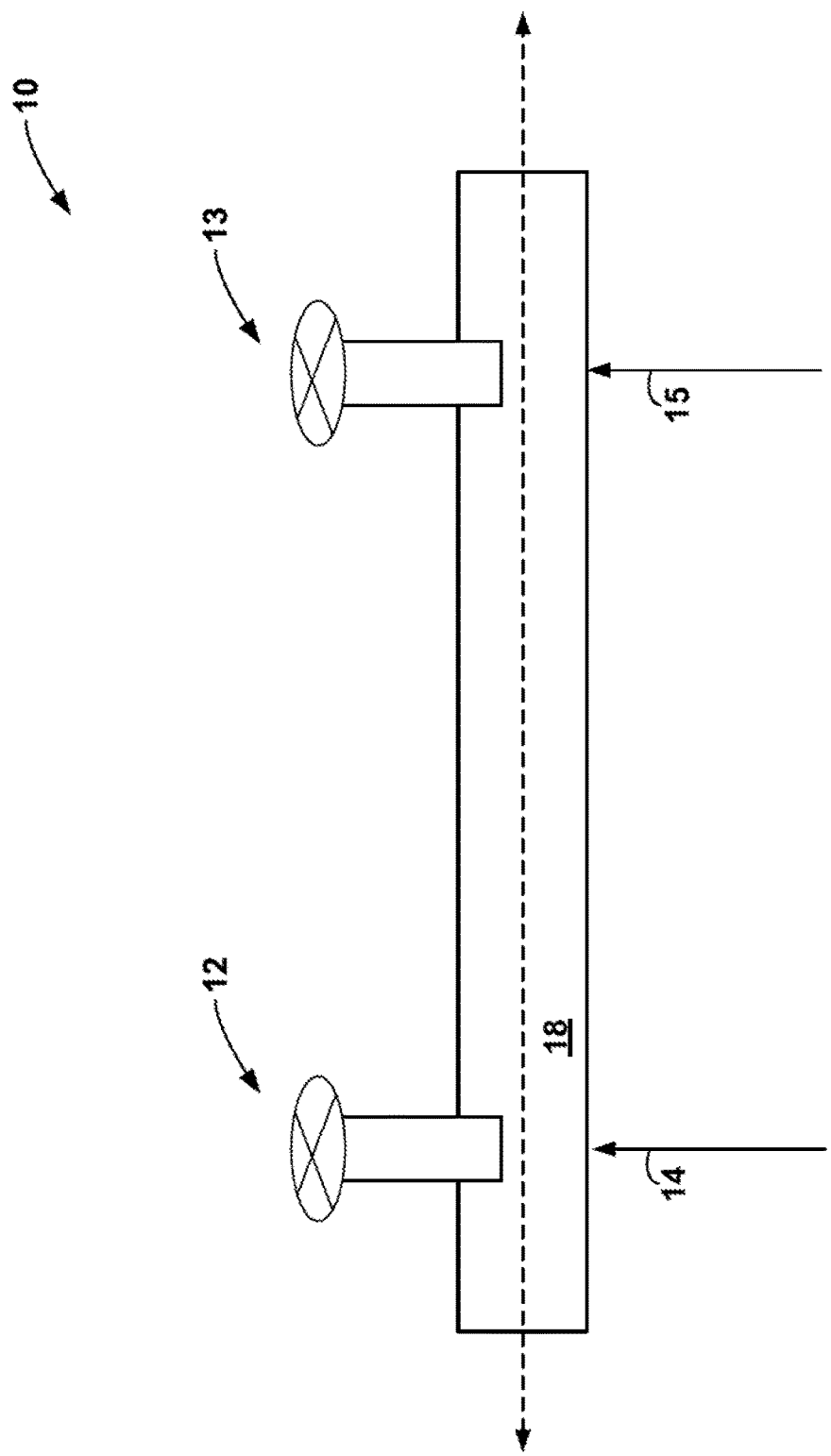
FIG. 8 is a schematic diagram of an aircraft, according to an example.

In contrast to the functionality described above, the tilt rotor aircraft 10 can also perform certain maneuvers (e.g., less aggressive maneuvers) without changing the orientation of the tilt rotor aircraft 10. Referring to FIG. 8 for example, the propulsion system 100 can make a second determination that changing the orientation of the tilt rotor aircraft 10 is not necessary to perform a second instructed flight maneuver. In this case, the second instructed flight maneuver is a gentle climb. Typically, the propulsion system 100 will make the determination that changing the orientation of the tilt rotor aircraft 10 is not necessary based on a performance characteristic (e.g., a physical limitation) of the rotor 12 and/or the rotor 13 and a current orientation of the tilt rotor aircraft 10. Examples of the performance characteristics of the rotor 12 and/or the rotor 13 that are evaluated include a maximum tilt angle, a maximum tilt velocity, and/or a maximum thrust. Other examples are possible. Here, the propulsion system 100 determines that changing the orientation of the tilt rotor aircraft 10 is not necessary because the rotor 12 is capable of providing the thrust 14 that is directed upward and the rotor 13 is capable of providing the thrust 15 that is directed upward and equal in magnitude to the thrust 14.

As a result of the determination that changing the orientation of the tilt rotor aircraft 10 is not necessary to perform the instructed flight maneuver, the propulsion system 100 causes the rotor 12 to provide the thrust 14 and the rotor 13 to provide the thrust 15, thereby providing lift to the tilt rotor aircraft 10 without generating a torque.

FIGS. 9-14 are block diagrams of the method 200, the method 250, the method 350, the method 450, the method 550, and the method 650. As shown in FIGS. 8-13, the method 200, the method 250, the method 350, the method 450, the method 550, and the method 650 include one or more operations, functions, or actions as illustrated by blocks 202, 204, 206, 208, 210, 212, and 214. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes making the determination that changing the orientation of the tilt rotor aircraft 10 is necessary to perform the instructed flight maneuver. Examples of this functionality are described above with reference to FIG. 3 and FIG. 6.

At block 204, the method 200 includes causing, in response to the determination, the rotor 12 of the tilt rotor aircraft 10 to provide the thrust 14, thereby applying the torque 16 to the tilt rotor aircraft 10 that changes the orientation of the tilt rotor aircraft 10. Examples of this functionality are described above with reference to FIGS. 3-7.

At block 206, the method 250 includes tilting the rotor 12 in response to the determination that tilting the rotor 12 with respect to the body 18 of the tilt rotor aircraft 10 is also necessary to perform the instructed flight maneuver. Examples of this functionality are described above with reference to FIGS. 6-7.

At block 208, the method 350 includes causing the rotor 12 to tilt to the maximum tilt angle θM in response to determining that performing the instructed flight maneuver without changing the orientation of the tilt rotor aircraft 10 requires tilting the rotor 12 beyond the maximum tilt angle θM. Examples of this functionality are described above with reference to FIGS. 6-7.

At block 210, the method 450 includes causing the rotor 12 to tilt at the maximum tilt velocity θM' in response to determining that performing the instructed flight maneuver without changing the orientation of the tilt rotor aircraft 10 requires tilting the rotor 12 at the tilt velocity that exceeds the maximum tilt velocity θM'. Examples of this functionality are described above with reference to FIGS. 6-7.

At block 212, the method 550 includes thrusting the rotor 12 at the maximum thrust in response to determining that performing the instructed flight maneuver without changing the orientation of the tilt rotor aircraft 10 requires thrusting the rotor 12 to exceed the maximum thrust. Examples of this functionality are described above with reference to FIG. 5 and FIG. 7.

At block 214, the method 650 includes determining the angle Y by which to change the orientation of the body 18 of the tilt rotor aircraft 10. In this context, causing the rotor 12 to provide the thrust includes causing the rotor 12 to change the orientation of the body 18 of the tilt rotor aircraft 10 by the angle φ. Examples of this functionality are described above with reference to FIGS. 4, 5, and 7.

Examples of the present disclosure can thus relate to one of the enumerated clauses (ECs) listed below.

Clause 1 is a propulsion system for controlling maneuvers of a tilt rotor aircraft, the propulsion system comprising: one or more processors; and a non-transitory computer readable medium storing instructions that, when executed by the one or more processors, cause the propulsion system to perform functions comprising: making a determination that changing an orientation of the tilt rotor aircraft is necessary to perform an instructed flight maneuver; and causing, in response to the determination, a rotor of the tilt rotor aircraft to provide a thrust, thereby applying a torque to the tilt rotor aircraft that changes the orientation of the tilt rotor aircraft.

Clause 2 is the propulsion system of clause 1, wherein making the determination comprises determining that tilting the rotor with respect to a body of the tilt rotor aircraft is also necessary to perform the instructed flight maneuver, the functions further comprising: tilting the rotor in response to the determination.

Clause 3 is the propulsion system of any of clauses 1-2, wherein making the determination comprises making the determination based on a performance characteristic of the rotor.

Clause 4 is the propulsion system of clause 3, wherein the performance characteristic includes a maximum tilt angle of the rotor.

Clause 5 is the propulsion system of clause 4, wherein making the determination comprises determining that performing the instructed flight maneuver without changing the orientation of the tilt rotor aircraft requires tilting the rotor beyond the maximum tilt angle.

Clause 6 is the propulsion system of clause 5, the functions further comprising causing the rotor to tilt to the maximum tilt angle in response to determining that performing the instructed flight maneuver without changing the orientation of the tilt rotor aircraft requires tilting the rotor beyond the maximum tilt angle.

Clause 7 is the propulsion system of any of clauses 3-6, wherein the performance characteristic includes a maximum tilt velocity of the rotor.

Clause 8 is the propulsion system of clause 7, wherein making the determination comprises determining that performing the instructed flight maneuver without changing the orientation of the tilt rotor aircraft requires tilting the rotor at a tilt velocity that exceeds the maximum tilt velocity.

Clause 9 is the propulsion system of clause 8, the functions further comprising causing the rotor to tilt at the maximum tilt velocity in response to determining that performing the instructed flight maneuver without changing the orientation of the tilt rotor aircraft requires tilting the rotor at a tilt velocity that exceeds the maximum tilt velocity.

Clause 10 is the propulsion system of any of clauses 3-9, wherein the performance characteristic includes a maximum thrust of the rotor.

Clause 11 is the propulsion system of clause 10, wherein making the determination comprises determining that performing the instructed flight maneuver without changing the orientation of the tilt rotor aircraft requires thrusting the rotor to exceed the maximum thrust.

Clause 12 is the propulsion system of clause 11, the functions further comprising thrusting the rotor at the maximum thrust in response to determining that performing the instructed flight maneuver without changing the orientation of the tilt rotor aircraft requires thrusting the rotor to exceed the maximum thrust.

Clause 13 is the propulsion system of any of clauses 1-12, the functions further comprising determining an angle by which to change the orientation of a body of the tilt rotor aircraft, wherein causing the rotor to provide the thrust comprises causing the rotor to change the orientation of the body of the tilt rotor aircraft by the angle.

Clause 14 is the propulsion system of any of clauses 1-13, wherein causing the rotor to provide the thrust comprises causing the rotor to provide the thrust to perform the instructed flight maneuver.

Clause 15 is the propulsion system of any of clauses 1-14, wherein causing the rotor to provide the thrust comprises causing the rotor to provide the thrust to rotate the tilt rotor aircraft about a pitch axis of a body of the tilt rotor aircraft.

Clause 16 is the propulsion system of any of clauses 1-15, wherein causing the rotor to provide the thrust comprises causing a first rotor of the tilt rotor aircraft to provide a first thrust and causing a second rotor of the tilt rotor aircraft to provide a second thrust that is different from the first thrust in magnitude.

Clause 17 is the propulsion system of any of clauses 1-16, wherein causing the rotor to provide the thrust comprises causing a first rotor of the tilt rotor aircraft to provide a first thrust that forms a first angle with a longitudinal axis of a body and causing a second rotor of the tilt rotor aircraft to provide a second thrust that forms a second angle with the longitudinal axis that is different from the first angle.

Clause 18 is the propulsion system of any of clauses 1-17, the functions further comprising: making a second determination that changing the orientation of the tilt rotor aircraft is not necessary to perform a second instructed flight maneuver; and causing, in response to the second determination, the rotor to provide a second thrust, thereby causing the tilt rotor aircraft to perform the second instructed flight maneuver while maintaining the orientation of the tilt rotor aircraft.

Clause 19 is a method for controlling maneuvers of a tilt rotor aircraft, the method comprising: making a determination, via a propulsion system, that changing an orientation of the tilt rotor aircraft is necessary to perform an instructed flight maneuver; and causing, via the propulsion system in response to the determination, a rotor of the tilt rotor aircraft to provide a thrust, thereby applying a torque to the tilt rotor aircraft that changes the orientation of the tilt rotor aircraft.

Clause 20 is a non-transitory computer readable medium storing instructions that, when executed by a propulsion system of a tilt rotor aircraft, cause the propulsion system to perform functions comprising: making a determination that changing an orientation of the tilt rotor aircraft is necessary to perform an instructed flight maneuver; and causing, in response to the determination, a rotor of the tilt rotor aircraft to provide a thrust, thereby applying a torque to the aircraft that changes the orientation of the tilt rotor aircraft. The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A propulsion system for controlling maneuvers of a tilt rotor aircraft, the propulsion system comprising:
   one or more processors; and
   a non-transitory computer readable medium storing instructions that, when executed by the one or more processors, cause the propulsion system to perform functions comprising:
   making a determination that changing an orientation of the tilt rotor aircraft is necessary to perform an instructed flight maneuver; and
   causing, in response to the determination, a rotor of the tilt rotor aircraft to provide a thrust, thereby applying a torque to the tilt rotor aircraft that changes the orientation of the tilt rotor aircraft.

2. The propulsion system of claim 1,
   wherein making the determination comprises determining that tilting the rotor with respect to a body of the tilt rotor aircraft is also necessary to perform the instructed flight maneuver, the functions further comprising:
   tilting the rotor in response to the determination.

3. The propulsion system of claim 1, wherein making the determination comprises making the determination based on a performance characteristic of the rotor.

4. The propulsion system of claim 3, wherein the performance characteristic includes a maximum tilt angle of the rotor.

5. The propulsion system of claim 4, wherein making the determination comprises determining that performing the instructed flight maneuver without changing the orientation of the tilt rotor aircraft requires tilting the rotor beyond the maximum tilt angle.

6. The propulsion system of claim 5, the functions further comprising causing the rotor to tilt to the maximum tilt angle in response to determining that performing the instructed flight maneuver without changing the orientation of the tilt rotor aircraft requires tilting the rotor beyond the maximum tilt angle.

7. The propulsion system of claim 3, wherein the performance characteristic includes a maximum tilt velocity of the rotor.

8. The propulsion system of claim 7, wherein making the determination comprises determining that performing the instructed flight maneuver without changing the orientation of the tilt rotor aircraft requires tilting the rotor at a tilt velocity that exceeds the maximum tilt velocity.

9. The propulsion system of claim 8, the functions further comprising causing the rotor to tilt at the maximum tilt velocity in response to determining that performing the instructed flight maneuver without changing the orientation of the tilt rotor aircraft requires tilting the rotor at a tilt velocity that exceeds the maximum tilt velocity.

10. The propulsion system of claim 3, wherein the performance characteristic includes a maximum thrust of the rotor.

11. The propulsion system of claim 10, wherein making the determination comprises determining that performing the instructed flight maneuver without changing the orientation of the tilt rotor aircraft requires thrusting the rotor to exceed the maximum thrust.

12. The propulsion system of claim 11, the functions further comprising thrusting the rotor at the maximum thrust in response to determining that performing the instructed flight maneuver without changing the orientation of the tilt rotor aircraft requires thrusting the rotor to exceed the maximum thrust.

13. The propulsion system of claim 1, the functions further comprising determining an angle by which to change the orientation of a body of the tilt rotor aircraft, wherein causing the rotor to provide the thrust comprises causing the rotor to change the orientation of the body of the tilt rotor aircraft by the angle.

14. The propulsion system of claim 1, wherein causing the rotor to provide the thrust comprises causing the rotor to provide the thrust to perform the instructed flight maneuver.

15. The propulsion system of claim 1, wherein causing the rotor to provide the thrust comprises causing the rotor to provide the thrust to rotate the tilt rotor aircraft about a pitch axis of a body of the tilt rotor aircraft.

16. The propulsion system of claim 1, wherein causing the rotor to provide the thrust comprises causing a first rotor of the tilt rotor aircraft to provide a first thrust and causing a second rotor of the tilt rotor aircraft to provide a second thrust that is different from the first thrust in magnitude.

17. The propulsion system of claim 1, wherein causing the rotor to provide the thrust comprises causing a first rotor of the tilt rotor aircraft to provide a first thrust that forms a first angle with a longitudinal axis of a body and causing a second rotor of the tilt rotor aircraft to provide a second thrust that forms a second angle with the longitudinal axis that is different from the first angle.

18. The propulsion system of claim 1, the functions further comprising:
    making a second determination that changing the orientation of the tilt rotor aircraft is not necessary to perform a second instructed flight maneuver; and
    causing, in response to the second determination, the rotor to provide a second thrust, thereby causing the tilt rotor aircraft to perform the second instructed flight maneuver while maintaining the orientation of the tilt rotor aircraft.

19. A method for controlling maneuvers of a tilt rotor aircraft, the method comprising:
    making a determination, via a propulsion system, that changing an orientation of the tilt rotor aircraft is necessary to perform an instructed flight maneuver; and
    causing, via the propulsion system in response to the determination, a rotor of the tilt rotor aircraft to provide a thrust, thereby applying a torque to the tilt rotor aircraft that changes the orientation of the tilt rotor aircraft.

20. A non-transitory computer readable medium storing instructions that, when executed by a propulsion system of a tilt rotor aircraft, cause the propulsion system to perform functions comprising:
    making a determination that changing an orientation of the tilt rotor aircraft is necessary to perform an instructed flight maneuver; and
    causing, in response to the determination, a rotor of the tilt rotor aircraft to provide a thrust, thereby applying a torque to the tilt rotor aircraft that changes the orientation of the tilt rotor aircraft.

* * * * *